United States Patent Office 2,972,591
Patented Feb. 21, 1961

2,972,591

COMPOSITIONS OF MATTER AND METHODS AND STEPS FOR MAKING AND USING THE SAME

Mortimer T. Harvey, South Orange, and Peter L. Rosamilia, Newark, N.J., assignors to Harvel Research Corporation, a corporation of New Jersey No Drawing. Filed Aug. 29, 1957, Ser. No. 680,906

7 Claims. (Cl. 260—23)

This invention relates to novel compositions of matter and methods for preparing them. More particularly, the invention is directed to organic reaction products obtained by reacting (I) maleic acid with Material (II) one or a combination of two or more butadiene-furfural organic reaction products. The butadiene-furfural organic reaction products employed in the practice of this invention are such Materials (II) having a softening point (ball and ring) no greater than 200° F. Throughout the present description and claims, the term butadiene is and shall mean the compound, butadiene 1,3; and unless otherwise specifically identified, maleic acid is and shall mean either maleic acid or its equivalent, maleic anhydride.

Prior to this invention, butadiene was reacted with furfural under varying conditions to provide a wide variety of compositions, all of which contained Material (II).

Among some of said Materials (II) which may be employed as starting materials in the practice of this invention are (IIA) substantially pure 2,3,4,5-bis($\Delta^2$-butenylene)-tetrahydrofurfural, as well as homopolymers thereof, and other compositions in which said compound and/or its polymers is present as a component in varying degrees of concentration and together with other organic compounds produced with furfural and/or butadiene under the particular reaction conditions employed.

Other Materials (II) which may be employed in the practice of this invention are those disclosed in a number of issued patents known to the art and made part hereof. Among them are (IIB) light colored, liquid organic reaction products of furfural and butadiene having an average molecular weight of about 210, fractions thereof having boiling points in the temperature range of 200–320° F. at an absolute pressure of 1 mm. of mercury pressure. Such reaction products and methods for producing them are disclosed in the U.S. patent to Herbolsheimer, 2,483,903, issued on October 4, 1945.

Still other examples of such Materials (II) are (IIC) the tarry by-products or residues obtained by Herbolsheimer in practicing the method disclosed in said patent.

Still other examples of said Materials (II) are (IID) the dark colored tarry residues obtained in the reaction of furfural and butadiene and varying in consistency from practically solid, semi-solid to fairly fluid light colored liquid masses. Such masses are composed chiefly of complex mixtures of reaction products of butadiene and furfural in various molecular proportions generally 1:1 and/or 2:1 and with a substantial part being in polymeric form, and also (IID) which either under atmospheric pressure or subatomspheric pressure, which may be as low as 5 mm. of mercury pressure and generally 5–125 mm. of mercury pressure, is heated to and maintained at a temperature in the range of 250–450° F. either in the presence or absence of an alkaline or acidic catalyst until the quantity by weight thereof measures at least 60% of that of the original mass of (IID) and the average molecular weight thereof is at least 660 and its viscosity at 25° C. is such that a solution of 5 parts thereof in 10 parts of furfural has a viscosity at least four times that of a solution consisting of 5 parts of (IID) in 10 parts of furfural and has a softening point (ball and ring) no greater than 180° F. Such end products are known herein as (IIE) and in general may be characterized as homopolymerized (IID).

Still other examples of Materials (II) are (IIF), the dark colored tarry residues which may vary in consistency from dark practically solid, semi-solid to fairly fluid lighter colored liquid masses which are complex mixtures of reaction products of butadiene and furfural and are by-products formed during the extractive distillation of a $C_4$ hydrocarbon mixture containing butadiene, employing furfural as the selective solvent and are generally known to the art as residues formed in the furfural extractive distillation method for the purification of butadiene. (A report on such residues, which the authors term "polymeric residue formed in the furfural extractive distillation method for the purification of butadiene" appears in an article entitled "Butadiene-Furfural Copolymers" by Hillyer et al., Ind. and Eng. Chem., vol. 40, November 1948, pp. 2216–2220, reference to which is hereby made.)

Still other examples of Materials (II) are (IIG) which are the materials produced by homopolymerizing (IIF) using the same methods as those set forth for the homopolymerization of (IID) to obtain (IIE).

The Materials (II) preferably employed in the practice of this invention are (IIC)–(IIG) some of which are liquid and others solid at 70° F. but all of which have average molecular weight of at least 330, viscosity at 25° C. of least 2,000 cp., are soluble in furfural, and have a softening point (ball and ring) of at least 60° F. and no greater than 180° F.

In general, the amount of alkaline agent employed in order to effect the homopolymerization is such that it is sufficient to increase the pH of the mass to be polymerized to a value of at least 8, but may be as high as desired, depending upon the speed of reaction required. In factory practice, we prefer to carry out said polymerization at a pH in the range of approximately 8 to approximately 12 although higher pH conditions, as high as 13.5 may be employed. (The method for measuring pH wherever it occurs throughout the present description is to place 10 grams of the materials whose pH is to be determined in 100 grams of distilled water, heat the mixture to boiling while stirring, allow to cool to room temperature and take the pH by means of pH papers. The pH papers employed were those known as "Hydrion" by Micro Essential Laboratories of Brooklyn, N.Y.) Said pH conditions in the range of approximately 8–13.5 are established at the beginning and reduced in the course of polymerization. Among some of the alkaline agents which may be employed in the practice of this invention are sodium hydroxide, potassium hydroxide, calcium hydroxide, etc., diethylene triamine, triethylene tetramine, ethanolamine, propylene diamine, 1,6-hexamethylene diamine, tetraethylene pentamine, etc.

When acidic agent is employed for homopolymerization, there is used an acidic agent in amount equal to the acidic polymerizable equivalent of at least one part by weight of sulfuric acid for each 200 parts of the Materials (II) to be polymerized. The quantity and nature of the acidic agent employed is such that the pH of a mixture of the acidic agent and Material (II) to be polymerized is lowered to a value no greater than approximately 3.5, but may be as low as desired, depending upon the speed of reaction required. In factory practice, said polymerization is carried out at a pH in the range of 1.5 to approximately 3.5. Among some of the acidic agents which may be employed for effecting said polymerization are sulfuric acid, hydrochloric acid, phosphoric acid, fluoboric acid, boron trifluoride, paratoluene sulfonic acid, alkyl sulfates such as the mono- and dialkyl sulfates, mono- or dimethyl, ethyl, propyl, etc. sulfates, phosphates, etc.

While various methods for producing Materials (II) may be employed, we shall set forth herein a number of illustrative examples which shall be sufficient for illustrating said Materials (II) which are employed as starting materials in the practice of this invention. The following examples A–H are given by way of illustration and not limitation of such Materials (II) and methods for producing them, all parts being given by weight unless otherwise specified.

EXAMPLE A

There is collected and obtained a batch of what is termed the "polymeric residue formed in the furfural extractive distillation method for the purification of butadiene." This raw residue which is a waste product or a by-product, generally is physically combined with water and therefore the batch is first placed in an oven and maintained at elevated temperature for about 15 hours for substantially complete dehydration and the resultant substantially dehydrated mass is hereinafter known as Material (II)K–A. The dehydration may be effected at atmospheric pressure and at temperatures of approximately 200–220° F.

EXAMPLE B

If desired, said original raw residue of Example A may be heated under either atmospheric or reduced pressure conditions to substantially completely dehydrate the mass at temperatures in the range of about 200–405° F. When the higher temperatures in said range are employed, furfural-butadiene reaction products come off as a distillate and are collected and are hereinafter known as Materials (II)K–B, leaving behind residual mass which is substantially completely dehydrated and having had said fraction removed at least in part therefrom, with said residual mass measuring at least 60% by weight of said dehydrated residue. Such dehydrated residual masses are also obtainable from said raw residue when said residue is maintained at the higher temperature of said range while under subatmospheric pressure of 5–125 mm. of mercury pressure. Said dehydrated residues, as well as said distillants and the residual masses of said residues in all cases have a molecular weight of at least 330, a viscosity of at least 2,000 cp. at 25° C., a softening point (ball and ring) of at least 60° F. and no greater than 200° F. and are soluble in furfural.

EXAMPLE C

Into an oven maintained at 260–280° F. was placed a steel drum containing 485 lbs. of raw residue obtained from a Texas plant of the Phillips Petroleum Co. of Bartlesville, Okla., and being a residue obtained as a by-product in the purification of butadiene in which the furfural extractive distillation method was employed by that company. Said residue is allowed to stand in that oven for a period of about 15–18 hours whereupon the residue was substantially completely dehydrated and somewhat higher volatiles originally contained therein had been driven off. At the end of that period, the mass in the container was still fluid at room temperature and is hereinafter known as Material (II)K–C.

EXAMPLE D

Into a closed vessel is charged 500 lbs. of raw residue obtained from the Sinclair Rubber Inc. of Texas, said residue being that obtained as a by-product in the purification of butadiene in which the furfural extractive distillation method was employed by that company. While under a vacuum of about 28" of mercury, the temperature of the raw residue is elevated slowly over about 1 hour period until it reached 215° F. and then the source of heat was removed and vacuum broken. The resultant dehydrated mass is thick, but pourable at room temperature and is hereinafter known as Material (II)K–D. In the course of heating, said raw residue under such subatmospheric conditions, a distillate was recovered and consisted mainly of water with a small amount of light volatiles. If desired, while under the same degree of vacuum, the mass may be further heated and maintained at a temperature of 325–350° F. whereupon more volatiles come off and the remainder is so thick or polymerized that a sample thereof when cooled to room temperature had a softening point (ball and ring) of 130–180° F. depending upon the time of heating, and such product is known hereinafter as Material (II)K–D1.

EXAMPLE E 800 lbs. of raw residue obtained from a Texas plant of the Phillips Petroleum Co. of Bartlesville, Okla., was another illustrative raw material used. The raw residue was the water-laden residue obtained as a by-product or waste product in the purification of butadiene in which the furfural extractive distillation method was employed by that company. This particular residue was quite heavy and a layer of water had separated out and floated on top of the residue. Most of the water layer was dipped off. Then to the residue which still contained an appreciable quantity of water, was transferred to a kettle, there was added an aqueous solution consisting of 8 lbs. of sodium hydroxide in 8 lbs. of water and the mass was agitated to distribute the sodium hydroxide throughout the residue. Then the mass was heated to a temperature of approximately 320–340° F. and maintained at that temperature while under subatmospheric conditions and a pressure of approximately 5–125 mm. of mercury pressure to substantially completely dehydrate the residue and to polymerize it to a softening point (ball and ring) of 165° F. This polymerized product so produced is solid at room temperature, but at 180° F. is liquid, that is, it will flow and such polymerized product is hereinafter known as Material (II)K–E.

EXAMPLE F

Into an oven maintained at 260–280° F. was placed a steel drum containing 485 lbs. of raw residue obtained from a Texas plant of the Phillips Petroleum Co. of Bartlesville, Okla., and being a residue obtained as a by-product in the purification of butadiene in which the furfural extractive distillation method was employed by that company. Said residue is allowed to stand in that oven at that temperature for a period of about 15–18 hours whereupon said residue was completely dehydrated and some of the higher volatiles originally contained therein had been driven off. At the end of that period the mass in the container was a dark, thick, yet fluid mass. This product is hereinafter known as Material (II)K–F. The entire mass may be transferred to a closed kettle, vented to the atmosphere through which distillates may pass and be collected, and heated to approximately 425° F. and maintained at that temperature for approximately 2 to 5 hours. Then the source of heat may be removed and the resultant mass poured into pans and allowed to cool to room temperature. At this temperature the mass will be a thermoplastic solid, insoluble in hot and cold V.M.P. naphtha and will have a softening point (ball and ring) of 170° F. and consists chiefly of a highly polymerized reaction mass. This product is hereinafter known as Material (II)K–F1. All distillates are collected and combined and then dehydrated at 220° F. while under 28" vacuum. The dehydrated combined distillates are known as Materials (II)K–F2. To the combined distillates either dehydrated or not and preferably the dehydrated mass has added thereto a solution consisting of 33 parts by weight of potassium hydroxide in 66 parts by weight of water. The quantity of said solution added is equal to 10 parts thereof to 100 parts of said distillate on a dry basis. The mass is mixed together and heated up to and maintained at 300° F. while being stirred and under such conditions after 13–14 hours is polymerized to such a degree that when cooled to room temperature it is a thermoplastic solid having a softening point (ball and ring) of approximately 180° F. and this product is known hereinafter as Material (II)K–F3.

To 100 lbs. of Material (II)K–F were mixed 6 lbs. of an aqueous solution consisting of 2 lbs. of sodium hydroxide in 4 lbs. of water. The mix was heated to and maintained at approximately 300° F. under atmospheric conditions until a solution of a 10-gram sample thereof at 25° C. dissolved in 5 grams of furfural had a viscosity at 25° C. about 4 times that of a solution of a 10-gram sample of the original Material (II)K–F dissolved in 5 grams of furfural. At this stage the mass is quickly cooled and there is added thereto an agent to neutralize the alkaline catalyst, if desired, and the polymerized product is hereinafter known as Material (II)K–F4.

EXAMPLE G

To the combined distillates Material (II)K–F2, either dehydrated or not and preferably in dehydrated condition, may be added about 10 parts of a 45% aqueous solution of fluoboric acid for each 100 parts of said dehydrated distillate. The mass is mixed together and maintained at 350° F. and under such conditions, until the viscosity of the mass at 25° C. was 20,000 cp. and this product is known hereinafter as Material (II)K–G.

To 100 lbs. of Material (II)K–F were mixed 15 lbs. of concentrated aqueous hydrochloric acid. The mix was heated to and maintained at approximately 290° F. until a solution of a 10-gram sample thereof at 25° C. dissolved in 5 grams of furfural had a viscosity at 25° C. about 2 times that of a solution of a 10-gram sample of the original Material (II)K–F dissolved in 5 grams of furfural. At this stage the mass is quickly cooled and there is added thereto an agent to neutralize the acidic catalyst and the polymerized product is hereinafter known as Material (II)K–G1.

EXAMPLE H

Into a closed vessel is charged approximately 500 lbs. of raw residue obtained from the Sinclair Rubber Inc. of Texas, said residue being that obtained as a by-product in the purification of butadiene in which the furfural extractive distillation method is employed by that company. While under a vacuum of about 28″ of mercury, the temperature of the raw residue is elevated slowly over about a one-hour period until it reaches approximately 215° F., then the source of heat is removed and the vacuum is broken. The resultant mass weighs approximately 375 lbs., is thick but pourable, has a molecular weight above 330, a viscosity about 2,000 cp. at 25° C. and is soluble in furfural and has a softening point (ball and ring) above 60° F. The material which distilled over during the course of that heat treatment under vacuum was collected and consisted mainly of water together with a small amount of light volatiles. This product, said 375 lbs. mass, is hereinafter known as Material (II)K–H.

If desired, while under the same degree of vacuum, the mass may be further heated and maintained at a temperature of 325–350° F. whereupon more distillate comes off, the distillate is collected and the remainder is so thickened or polymerized that a sample thereof when cooled to room temperature has a softening point (ball and ring) of 130–180° F. At that stage the mass is cooled to room temperature and will be found to be a thermoplastic and substantially solid resinous mass soluble in furfural and hereinafter known as Material (II)K–H1. The distillates were combined and are known as Material (II)K–H2.

To 100 parts of said Material (II)K–H2 calculated on a dry basis and being either in combination with the water or dehydrated, was added 8 parts of diethyl sulphate. The mix was heated to and maintained at 280° F. until a sample thereof had a viscosity at 25° C. approximately 10 times that of the original Material (II)K–H2 in dehydrated state, and this thickened or polymerized product is hereinafter known as Material (II)K–H3, is soluble in furfural and is in the liquid state.

To 100 lbs. of Product (II)K–H is added 2 lbs. of an aqueous solution consisting of 1 lb. of sulfuric acid in an equal quantity of water. The mix is heated to and maintained at 325° F. until the viscosity at 25° C. of a solution of a 10-gram sample thereof in 5 grams of furfural is two times that of a solution of a 10-gram sample of the original Material (II)K–H in 5 grams of furfural. Then the acidic agent is neutralized and cooled to room temperature. The so-thickened or polymerized mass is soluble in furfural and is liquid at 180° F. and is known as Material (II)K–H4.

In the course of our experimentation with Materials (II) some examples of which are Materials (IIA)–(IIG), we have discovered that Materials (II) may be reacted with maleic acid to provide organic reaction products which find application in a number of different fields. In general, the ratio by weight of Materials (II) to the maleic acid employed in a mix for reaction is 5 to 50 parts of maleic acid for each 100 parts of Materials (II). Such components in the aforesaid proportions are preferably mixed together and then while being stirred, are heated to a temperature generally in the range of 100–125° C. or higher whereupon reaction takes place to provide novel reaction products.

The novel reaction products of this invention may be mixed with hexamethylene tetramine in the proportion by weight of about 100 parts of the former to 5–15 parts of the latter and such mixture may be heated to 150° C. and maintained at that temperature for a period of 24 hours after which it will be found to be in the solid and substantially infusible state and may be comminuted into a fine powder or dust finding application as friction augmenting particles in friction elements, such as brake linings and clutch facings. The novel reaction products of this invention may be first dissolved in a solvent and then mixed with hexamethylene tetramine in the proportions hereinbefore set forth, together with an appropriate quantity of asbestos fiber in the proportions normally used in the manufacture of such friction elements and together with barytes with or without other brake lining components. This mass may be all mixed together in any suitable mixture after which it is extruded, cut and shaped in arcuate form or otherwise treated to provide combinations of the desired shapes and size which now are heated to drive off the solvent and then placed in a press and heated to temperatures up to about 400–450° F. to provide dense elements useful as such friction elements and in which the novel reaction products and hexamethylene tetramine mix has been converted to the solid and substantially infusible state acting as a binder for the asbestos fibers and other components thereof. The novel reaction products in the presence or absence of the hexamethylene tetramine also find application as molding powder resins. The novel reaction products may be combined with glycidyl polyethers of polyhydric phenols which may be either mononuclear or polynuclear, as well as such ethers of polyhydric alcohols and in all cases, we prefer that such polyhydric compounds employed have an epoxide equivalency greater than 1.

Said glycidyl polyethers of the aliphatic polyhydric alcohols are obtainable by practicing the methods known to the art, an example of which is to react such alcohol with epichlorhydrin or glycerol dichlorhydrin in the presence of a suitable acidic catalyst, such as boron trifluoride and then converting said reaction product to the polyepoxide by employing suitable alkaline agents, such as sodium hydroxide, sodium aluminate, etc. Examples of some of said glycidyl polyethers are those of such alcohols as diethylene glycol, propylene glycol, glycerol, etc., and all of which have a 1,2-epoxide equivalency greater than 1.

The glycidyl polyethers of polyhydric phenols are obtainable by reacting a polyhydric phenol with epichlorhydrin in basic medium at about 50° C. to 150° C. with use of more than one mole of epichlorhydrin per equivalent of phenolic hydroxyl group of the phenol and a slight stoichiometric excess of base such as about 2% to 3% excess sodium or potassium hydroxide. The reaction is effected by heating for several hours and the product is then separated from formed salt, excess base, and any unreacted epichlorhydrin. It is usually preferred to employ glycidyl polyether of a dihydric phenol in the invention, which product, instead of being a single simple compound, is generally a complex mixture of glycidyl polyethers, but the principal product may be represented by the formula

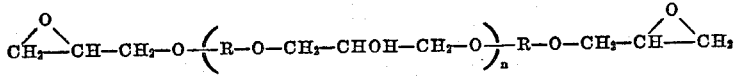

wherein $n$ is an integer of the series 0, 1, 2, 3 . . . , and R represents the divalent hydrocarbon radical of the dihydric phenol. While for any single molecule of the polyether $n$ is an integer, the fact that the obtained polyether is a mixture of compounds causes the determined value for $n$, e.g., from molecular weight measurement, to be an average which is not necessarily zero or a whole number. Although the polyether is a substance primarily of the above formula, it may contain some material with one or both of the terminal glycidyl radicals in hydrated form, and therefore, the 1,2-epoxy equivalency approaches, but is not equal to 2.0; it is a value between 1.0 and 2.0.

The simplest of the polyethers is the diglycidyl diether of a dihydric phenol. It contains a single divalent aromatic hydrocarbon radical from the dihydric phenol and has two glycidyl radicals linked thereto by etheral oxygen atoms. More generally, the polyether of dihydric phenols is of more complex character and contains two or more aromatic hydrocarbon radicals alternating with glyceryl groups in a chain which are linked together by intervening etheral oxygen atoms.

The 1,2-epoxy equivalency of the glycidyl polyether refers to the number of 1,2-epoxy groups

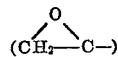

contained in the average molecule of the polyether. The 1,2-epoxy equivalency is thus dependent upon the molecular weight and the epoxide value which is measured as gram equivalents of epoxide per 100 grams of polyether. The 1,2-epoxide value is determined by heating a weighed sample of polyether with an excess of 0.2 N pyridinium chloride in chloroform solution at the boiling point under reflux for two hours whereby the pyridinium chloride hydrochlorinates the epoxy groups to chlorhydrin groups. After cooling, the excess unreacted pyridinium chloride is back-titrated with 0.1 N sodium hydroxide in methanol to the phenolphthalein end point. The epoxide value is calculated by considering one HCl as equivalent to one epoxide group. This method is used for obtaining all epoxide values discussed herein.

Any of the various polyhydric phenols used in preparing the polyethers include mononuclear phenols such as resorcinol, catechol, hydroquinone, methyl resorcinol, etc.; or polynuclear phenols like 2,2-bis(4-hydroxyphenyl) propane which is termed bis-phenol herein for convenience, 4,4$^1$ - dihydroxybenzophenone, bis - (4 - hydroxyphenyl)-methane, 1,1-bis (4-hydroxyphenyl) ethane, 1,1-bis (4-hydroxyphenyl) isobutane, 2,2-bis (4-hydroxyphenyl) butane, 2,2-bis (4-hydroxy-2-methylphenyl) propane, 2,2-bis (4-hydroxy-2-tertiary butylphenyl) propane, 2,2-bis (2-hydroxy naphthyl) pentane, 1,5-dihydroxynaphthalene, etc., as well as more complex polyhydric phenols such as pyrogallol, phloroglucinol, and novolac resins from condensation of a phenol with an aldehyde in the presence of an acidic condensation catalyst. Preparation of glycidyl polyether of novolac resin is described in Example 27 of German Patent No. 676,117.

Other examples of such glycidyl polyethers of bisphenols are those obtainable by reacting epichlorhydrin in a basic medium with the organic reaction products produced by reacting a material selected from the class consisting of hydroxy benzene, naphthol, anthranol and their homologues with a phenol having an unsaturated hydrocarbon substituent, with such reaction products being shown in the U.S. patent to M. T. Harvey, 2,317,607, issued April 27, 1943, and glycidyl polyether of certain of said reaction products being shown in U.S. patent to

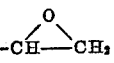

D. Wasserman, 2,665,266. Still other examples of said glycidyl polyethers of bis-phenols are those which may be derived from any of the other bis-phenols produced according to said Harvey patent. Such bis-phenols may be reacted with epichlorhydrin in the presence of an alkali employing in general the procedure set forth in the aforesaid Wasserman patent to produce the glycidyl polyethers of said other bis-phenols.

Such combinations of said novel reaction products and such glycidal polyethers may be cured in the presence of an acid such as phthalic acid or its equivalent, phthalic anhydride to provide compositions of high heat stability.

While glycidyl ethers are given as illustrative examples, we consider our invention to apply to any compound containing the epoxy group

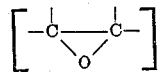

a further example being the epoxydized butyl oleate manufactured by Union Carbide Chemicals Co., and identified by them as EP–201, 306–RD–20; and epoxydized glycerides of fatty acids, saturated and unsaturated, e.g., epoxydized soya bean oil.

The following are some examples of this invention and are given by way of illustration and not limitation, all parts being given by weight unless otherwise specified.

*Example 1*

100 parts of Material (II)K–A and 10 parts of maleic anhydride were heated to a temperature of 100° C. and the heating was continued until it reached a temperature no greater than a temperature of 125° C. and when a sample thereof when cooled to room temperature was a brittle button and is still fusible. The mass is immediately cooled to provide a Material (II)-maleic acid organic reaction product which is liquid at 125° C. If desired, to said organic reaction product while hot, may be added hexamethylene tetramine in an amount equal to 10% of the weight thereof and this mass is heated to a temperature of 150° C. and maintained at that temperature for a period of 24 hours after which, it will be found to have been converted into a solid substantially infusible mass which was comminuted into a fine powder or dust and finds application as friction augmenting particles in brake linings and clutch facings.

*Example 2*

100 parts of 2,3,4,5-bis($\Delta^2$-butenylene) tetrahydrofurfural and 25 parts of maleic anhydride were heated to a temperature of approximately 125° C. and were maintained at that temperature for a period of approximately 30 minutes after which the reaction mass was cooled to room temperature and is hereinafter known as Product 2. To 100 parts by weight of Product 2, there was added 7 parts by weight hexamethylene tetramine and this mix was placed in an oven maintained at 150° C. for 24 hours for conversion to the substantially solid and infusible state after which it was comminuted to provide friction augmenting particles. 100 parts of Product 2 was dissolved in an organic solvent such as methyl ethyl ketone and to this solution were added 25 parts of asbestos fibers and 5 parts of barytes. The mass was placed in a mold of arcuate shape and heated to drive off the solvent and then this arcuate shaped mass, while under pressure of 500 lbs. per sq. in. held at a temperature of 320° F. for 20 minutes is removed from the mold and cooled to room temperature. Subsequently it is placed in an open oven and heated gradually from room temperature to a temperature of approximately 375° F. over a period of 24 hours to convert the same into a dense arcuate article of manufacture useful as a brake lining and in which the Product 2 and hexamethylene tetramine had been converted to the substantially solid and infusible state.

*Example 3*

100 parts of Material (II)K–D1 and 40 parts of maleic anhydride were heated to a temperature of 100° C. and heating was continued until the temperature reached was no greater than 125° C. and when a sample thereof when cooled to room temperature is a brittle fusible button. Then the mass was cooled and there was added thereto 7½% by weight of hexamethylene tetramine and this mix was heated to and maintained at 150° C. for 24 hours, cooled to room temperature when it was found to be solid and infusible and when ground into a fine dust, finds application as friction augmenting particles.

*Example 4*

35 parts of Product 1, 70 parts of "Shell Epon 828" (having an epoxy equivalent of 200), 40 parts of phthalic anhydride were heated until solution took place, care being taken to maintain the temperature below 100° C. to provide Product 4 which was applied on a glass cloth which was folded over to provide a laminate. The laminate was cured for one hour at 150° C. and at the end of that period it was found that the glass cloth layers were very firmly laminated to each other.

*Example 5*

35 parts of Product 1, 70 parts of "Shell Epon 828" and 55 parts of phthalic anhydride together with 20 parts of Product X, hereinafter described, were all heated together to a temperature in the range of 70–75° C. and then applied to glass cloth or filaments which were substantially cool-rolled with interleaving sheets of polyethylene. These may be stored for several months before fabrication. For fabrication, the polyethylene sheets were stripped off and the coated cloth or filaments were placed together and were maintained under pressure of about 25 lbs. per sq. in. while at a temperature of 330° C. for 30 minutes to provide a very strong laminated structure.

Product X may be produced by mixing together 20 parts of the amber colored resin produced by reacting acetone and formaldehyde as shown in Example 1 of U. S. Patent 2,683,133 with 10 parts of polyethylene glycol 400. Such mix is heated to and maintained at that temperature range of 180–200° C. for a 2" string, when it is immediately cooled and is the Product X referred to hereinbefore.

Since certain changes in carrying out the aforesaid processes and certain modifications in the compositions which embody the invention may be made without departing from its scope, it is understood that all matter contained in the description shall be interpreted as illustrative and not in a limiting sense.

It is also to be understood that the following claims are intended to cover all the generic and specific features of the invention, which as a matter of language might be said to fall therebetween; and that they are intended to be inclusive in scope and not exclusive, in that, if desired, other materials may be added to our novel compositions of matter herein claimed without departing from the spirit of the invention. Particularly it is to be understood that in said claims, ingredients or components recited in the singular are intended to include compatible mixtures of said ingredients wherever the sense permits.

This application is a continuation in part of our copending application Ser. No. 435,621 (Patent No. 2,816,878 of December 17, 1957) filed June 9, 1954, which in turn is a continuation in part of our application Ser. No. 211,576, filed February 17, 1951, and now abandoned.

Having thus described the invention, what we claim is:

1. A novel organic reaction product produced by heat reacting (I) maleic acid and (II) butadiene-furfural organic reaction product having a softening point (ball and ring) no greater than 200° F.

2. A novel organic reaction product as defined in claim 1 with (II) being organic residue obtained in the furfural extractive distillation method for the purification of butadiene.

3. A novel organic reaction product defined in claim 1 with (II) being a residual fraction of organic residue obtained in the furfural extractive distillation method for the purification of butadiene, said fraction produced by heat distillation of said residue.

4. A substantially solid and infusible mass obtained by heating together a mixture of hexamethylene tetramine and a novel composition defined in claim 1.

5. A novel composition of matter comprising a novel composition of matter defined in claim 1 intimately combined with a glycidyl polyether of a material selected from the group consisting of polyhydric phenols and aliphatic polyhydric alcohols.

6. The method comprising heating together (I) maleic acid and (II) butadiene-furfural organic reaction product having a softening point no greater than 200° F. to produce an organic reaction product therebetween.

7. A composition defined in claim 1 intimately combined with an epoxidized glyceride of a fatty acid.

References Cited in the file of this patent

UNITED STATES PATENTS

| | | |
|---|---|---|
| 2,375,256 | Soday | May 8, 1945 |
| 2,382,184 | Thompson | Aug. 14, 1945 |
| 2,634,256 | Sparks et al. | Apr. 7, 1953 |
| 2,785,148 | Hillyer et al. | Mar. 12, 1957 |
| 2,798,833 | Lapsensohn et al. | July 9, 1957 |
| 2,816,286 | Harvey et al. | Feb. 25, 1953 |
| 2,844,502 | Paxton | July 22, 1958 |

FOREIGN PATENTS

| | | |
|---|---|---|
| 602,843 | Great Britain | July 3, 1948 |

OTHER REFERENCES

Hillyer: Butadiene-Furfural Copolymers, p. 2216–2220, Ind. & Eng. Chem., November 1948.

Charlton: Alloying With Epoxies, p. 155–7, 160–1, 240–3, Modern Plastics, September 1954.